May 21, 1963

J. GILL 3,090,916

MULTIPLE RANGE MEASURING SYSTEM FOR NON-LINEAR INPUT SIGNALS
USING FEEDBACK GAIN CONTROL MEANS TO
PROVIDE A LINEAR RESPONSE
Filed May 26, 1961

INVENTOR.
JOSEPH GILL

BY

Dean, Fairbank & Hirsch
ATTORNEYS

United States Patent Office 3,090,916
Patented May 21, 1963

3,090,916
MULTIPLE RANGE MEASURING SYSTEM FOR NON-LINEAR INPUT SIGNALS USING FEEDBACK GAIN CONTROL MEANS TO PROVIDE A LINEAR RESPONSE
Joseph Gill, Bridgeville, Pa., assignor to Hagan Chemicals & Controls, Inc., Pittsburgh, Pa., a corporation of Pennsylvania
Filed May 26, 1961, Ser. No. 113,019
1 Claim. (Cl. 324—115)

This invention relates to the art of monitoring equipment and more particularly to a meter system that will give an accurate indication of the value of a condition being measured.

As conducive to an understanding of the invention, it is to be noted that where a wide range of conditions are to be indicated on a meter, resolution and accuracy of reading may be poor. In addition, where the meter error is a percentage of full scale, any indicated position on the scale might have the same absolute error and this is especially serious where the indicated value is only a small portion of the total scale.

Where the value of a condition being monitored is initially determined by a suitable transducer which has an output that is non-linear with respect to changes of the value of such condition, if in order to accurately indicate such values on a meter, differently calibrated dials are used, they are relatively difficult to read and resolution and accuracy are poor.

It is accordingly among the objects of the invention to provide a meter type monitoring system that is relatively simple in construction having relatively few parts that are not likely to become out of order, that will provide a high degree of resolution and accuracy of reading of the indicated value on the meter with a minimum effect of the meter error, even on readings of relatively small value, and which will permit use of a single linearly calibrated dial to provide accurate readings of even non-linear outputs.

According to the invention, by means of suitable networks, given increments of input signal voltage may be cancelled out so that the maximum remaining signal voltage will be no greater than the range of the meter for the value of the condition corresponding to such remaining signal voltage. In addition, for each range of the condition being monitored, the gain of the system is adjusted so that a given output voltage will be provided to effect full scale indication of the meter.

This application is a continuation-in-part of copending application Serial No. 698,986, filed November 26, 1957, now Patent No. 2,989,701, dated June 20, 1961.

In the accompanying drawings in which are shown one or more of various possible embodiments of the several features of the invention:

Figure 1:
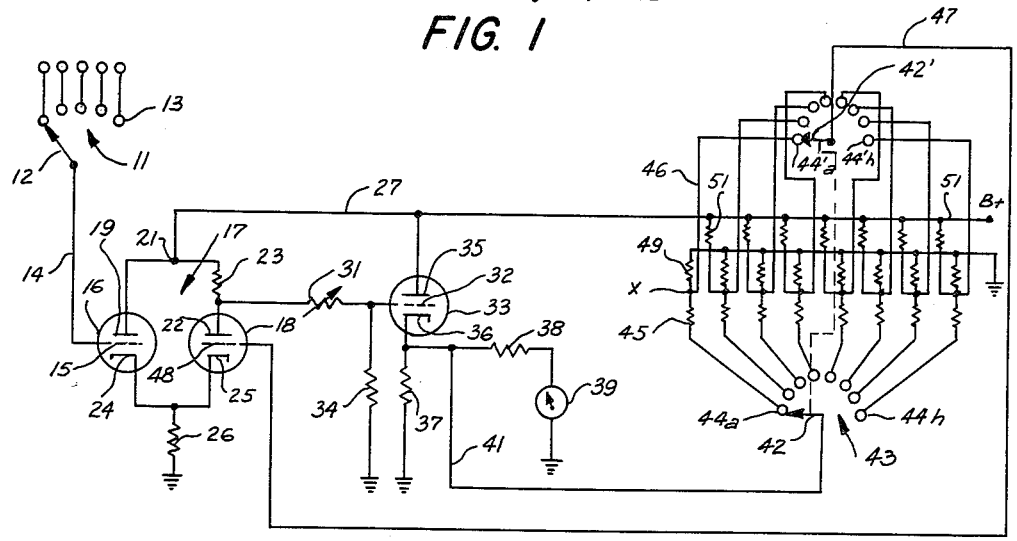
FIG. 1 is a circuit diagram of one embodiment of the system.

Referring now to FIG. 1 of the drawings, the equipment diagrammatically shown comprises a selector switch 11 the movable contact arm 12 of which may engage any one of a plurality of fixed contacts 13 to each of which is connected a transducer (not shown), which illustratively may be a temperature responsive device having a direct current output voltage proportional to temperature.

The contact arm 12 is connected by lead 14 to the grid 15 of a vacuum tube 16 which forms one section of a differential amplifier 17 having a second vacuum tube 18. The plate 19 of vacuum tube 16 is connected to junction 21 and the plate 22 of vacuum tube 18 is connected through plate resistor 23 to junction 21.

The cathodes 24, 25 of vacuum tubes 16 and 18 are connected through common cathode resistor 26 to ground. The junction 21 is connected through common lead 27 to a B+ supply, illustratively, 300 volts. The plate 22 of vacuum tube 18 is connected through variable zero adjust resistor 31 to the grid 32 of cathode follower tube 33 and also through biasing resistor 34 to ground. The plate 35 of cathode follower 33 is connected to B+ lead 27 and the cathode 36 of cathode follower 33 is connected through cathode resistor 37 to ground.

The cathode 36 of cathode follower 33 is connected through resistor 38 to one side of meter 39, the other side of which is connected to ground, the resistor 38 limiting the current to the meter 39. The cathode 36 is also connected by lead 41 to the movable contact arm 42 of range switch 43, said arm 42 successively engaging fixed contacts 44a to 44h.

Each of the contacts 44a to 44h is connected to one end of a resistor 45, the other end of which defines a junction $x$ that is connected by leads 46 to the associated fixed contact 44'a to $h$ of switch 43 designed to be successively engaged by contact arm 42', ganged with contact arm 42 and connected by lead 47 to the grid 48 of vacuum tube 18 of differential amplifier 17.

Each of the junctions $x$ is connected to one end of a resistor 49, the other end of which is connected to ground and each of the junctions $x$ associated with contacts 44b to 44h is also connected to one end of a resistor 51, the other end of which is connected to B+ lead 27.

In the operation of the equipment, the switch 11 is set to the position of the transducer whose output is to be measured. The output of the transducer which is a positive D.C. voltage proportional to the temperature of the condition being monitored, in the illustrative embodiment herein, is fed through lead 14 to the grid 15 of vacuum tube 16.

The D.C. signal from the transducer applied to the grid 15 of vacuum tube 16 of differential amplifier 17 will cause an increase in the current flowing through common cathode resistor 26.

As a result, the cathode of vacuum tube 18 will become more positive to cause a decrease in the current flow in vacuum tube 18 so that the voltage on the plate 22 of vacuum tube 18 will rise and a corresponding positive signal will be applied to the grid 32 of cathode follower 33. As a result of the action of the cathode follower, the same signal will appear at the cathode 36 thereof and will be fed through resistor 38 to the meter M as a positive signal proportional to the input signal, i.e., proportional to the output of the transducer.

The output signal is also fed from cathode 36 through lead 41 to the contact arm 42 of switch 43 which illustratively is engaging contact 44a. Hence, the signal will flow through resistors 45 and 49 to ground. The resistors 45 and 49 act as a voltage divider and the portion of the output signal across resistor 49, which defines a feedback resistor, is taken from junction $x$ and fed through lead 46 to contact 44'a and thence from contact arm 42', lead 47 to the grid 48 of vacuum tube 18 of differential amplifier 17.

Since grid 48 becomes more positive, the current flow through resistor 23 will increase and the output voltage of the differential amplifier will decrease.

The gain of the system is sufficiently high so that the portion of the output signal developed across resistor 49, i.e., the feed back voltage, will be substantially equal to the input signal to the system so that the system will stabilize with an output voltage that will provide the desired full scale reading on the meter 39 for an input voltage from the transducer proportional to the maximum value of the first range, determined by the position of switch 43 at contacts a.

The feed back thus stabilizes the system so that it is substantially independent of tube characteristics and voltage changes.

The temperature responsive transducer employed is the type having an output that follows a non-linear curve, i.e., for a temperature change from 0–100 degrees the signal voltage from the transducer is from 0–10 mv.; from 100–200 degrees, the signal voltage is from 10–21 mv. and from 200–300 degrees, the signal voltage is from 21–36 mv. and with each 100 degree interval the slope is linear. If not linear, of course smaller intervals can be used. At positions a, b and c respectively, of switch 43, the range is illustratively 0–100 degrees; 100–200 and 200–300 degrees.

The meter at full scale illustratively has a reading of 100 degrees and requires 1 ma. therethrough to provide full scale indication.

If the ratio of the output resistors 45, 49 is such as to provide a gain of 1,000 for the system, with a 10 mv. input signal, the voltage across resistors 45, 49 will be 10 volts. If the value of resistor 38 plus the meter resistance is 10,000 ohms, 10 volts across the meter will provide the required 1 ma. for full scale indication with an input signal of 10 mv.

With resistors 45 and 49 having values of 9,990 ohms and 10 ohms respectively, at position a of switch 43 the ratio of the sum of resistors 45 and 49, i.e., 10,000 ohms to the value of resistor 49, i.e., 10 ohms, will provide the desired gain of 1,000 for full scale indication on the meter with the input signal of 10 mv. As 10 volts will appear across resistors 45 and 49, 1 ma. of current will flow therethrough and hence the voltage across resistor 49 will be 10 mv. This voltage is fed back to grid 48 of vacuum tube 18 of differential amplifier 17 to establish the gain of the system, so that with an input signal of 10 mv., for example, the voltage across resistors 45 and 49 will be retained at 10 volts and hence 10 volts will appear across the meter to provide the required 1 ma. for full scale indication with an input signal of 10 mv.

As the output from the transducer for the 100–200 degree range is from 10 to 21 mv., in order that the same meter scale be used, it is necessary that the signal voltage due to the first 100 degrees, i.e., 10 mv., be neutralized and also that the gain of the system be changed so that 11 mv. from 100–200 degrees still provides full range deflection on the meter, i.e., it is necessary that the output voltage with an effective signal voltage of 11 mv., still be 10 volts.

To this end, the feed back network comprising resistors 45, 49, and 51 must cancel out 10 mv. of input signal and also must reduce the gain of the system to provide a 10 volt output with an 11 mv. input.

If feed back resistor 49 at the second range b of the switch 43 has a value of 11 ohms and resistor 45 a value of 9,989 ohms, the ratio therebetween will provide a reduced gain for the system such that 11 mv. input signal will provide 10 volts output as desired. Thus, 10 volts across resistors 45, 49 will cause 1 ma. current flow so that the voltage across resistor 49 will be 11 mv.

In addition, as it is desired that only 11 mv. of the total input voltage of 21 mv. be considered, if the resistor 51 which is in series with resistor 49, which has a value of 11 ohms and the B+ source of 300 volts, has a value of 330K, then the fixed voltage developed across resistor 49 will be 10 mv.

As a result, a fixed voltage of 10 mv. will be applied to grid 48 of tube 18 due to resistance 49 and 51 to neutralize a portion of the 21 mv. input signal from the transducer so that only 11 mv. will be amplified and the feed back voltage from resistor 49 will retain the output at 10 volts for such an input.

It is apparent therefore that the meter reading of 100 degrees when added to the value of 100 degrees indicated at contact B of switch 42 will represent a temperature of 200 degrees.

Similarly, with a transducer output of from 21–36 mv. over the range from 200–300 degrees, 21 mv. must be neutralized and the gain of the system adjusted so that the remaining 15 mv. will still provide a 10 volt output.

To this end, resistor 49 has a value of 15 ohms, and resistor 45 a value of 9,985 ohms to further reduce the gain of the system to provide a 10 volt output with a 15 mv. input. To neutralize 21 mv. of the input signal, the value of resistor 51 in series with resistor 49 is 214.5K.

Figure 2:
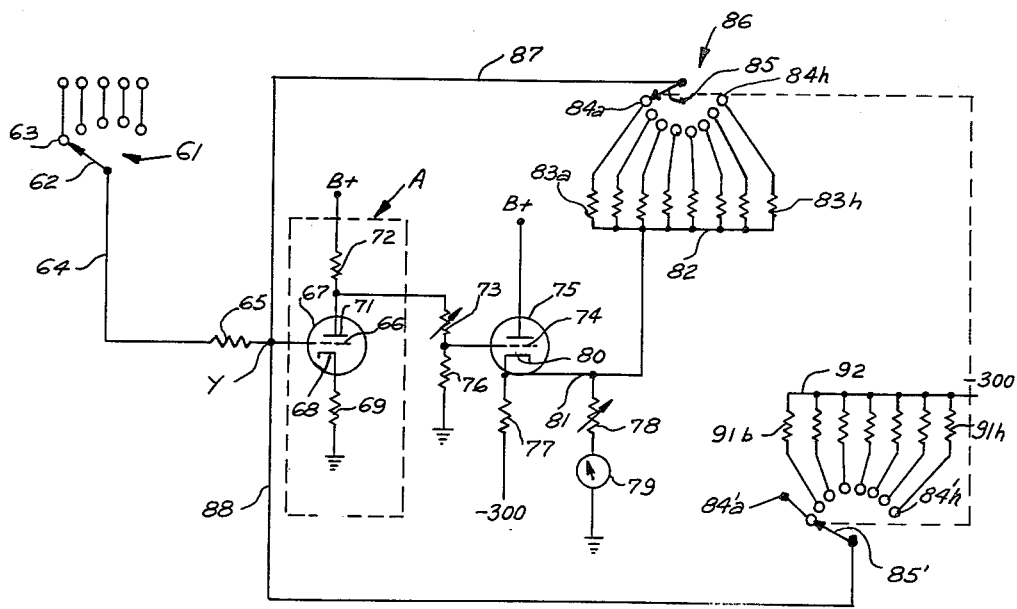
FIG. 2 is a circuit diagram of another embodiment of the system.

The embodiment shown in FIG. 2 desirably comprises a selector switch 61, the movable contact arm 62 of which may engage any one of a plurality of fixed contacts 63 to each of which is connected a transducer (not shown) which illustratively may be a temperature responsive device having a direct current output voltage proportional to temperature.

The contact arm 62 is connected by lead 64 through resistor 65 to junction Y and then to the grid 66 of a vacuum tube 67 which forms part of a high gain amplifier A that may have as many stages as desired.

The cathode 68 of tube 67 is connected through resistor 69 to ground. The plate 71 is connected through load resistor 72 to a positive B+ source and also through resistor 73 to the grid 74 of a cathode follower tube 75, said grid being biased by resistor 76 connected to ground. The plate of tube 74 is connected to B+ and the cathode is connected through resistor 77 to a source of potential, illustratively −300 volts and through meter resistor 78 and meter 79 to ground. In addition, the cathode 80 of tube 75 is connected by lead 81 to lead 82 to which is connected one end of a plurality of feed back resistors 83a to 83h. The other end of each resistor is connected to a fixed contact 84a to 84h respectively, adapted to be successively engaged by contact arm 85 of switch 86 which is connected by lead 87 to junction Y. Junction Y is also connected by lead 88 to contact arm 85' of switch 86, ganged with contact arm 85 so as to move in unison therewith, said contact arm 85' being adapted successively to engage fixed contacts 84'a to 84'h.

The contact 84'a is open ended and each of the contacts 84'b to 84'h is connected through a fixed resistor 91b to 91h to lead 92 which is connected to a negative source of potential, illustratively −300 volts.

In the operation of the equipment the switch 61 is set to the position of the transducer whose output is to be measured. The output of the transducer which, illustratively, is a positive D.C. voltage proportional to the temperature of the condition being monitored is fed through resistor 65 which illustratively has a value of 1,000 ohms, to grid 66 of high gain amplifier A.

When grid 66 becomes more positive, the plate voltage of amplifier A will drop and the grid 74 of cathode follower 75 will become more negative. As the voltage on the cathode 80 of cathode follower 75 initially was set to zero, the drop in the grid voltage of cathode follower 75 will cause the cathode voltage to drop so that a negative voltage will be provided from such cathode 80, i.e., the output voltage, and this output voltage will be fed through resistor 78 to the meter 79 as a negative signal proportional to the input signal, i.e., proportional to the output of the transducer. Of course, in conventional manner, the leads of the meter 79 can be reversed so that the indicating needle thereof will move in conventional direction, i.e., in a clockwise direction.

The output signal is also fed from cathode 80 through lead 81 to lead 82 and thence through one of the resistors 83 back to junction Y to define a feed back signal for the system.

The temperature responsive transducer employed is of the type having an output that follows a non-linear curve, i.e., for a temperature change from 0 to 100 degrees the signal voltage from the transducer is from 0–10 mv.; from 100 to 200 degrees the signal voltage is from 10 to 21 mv. and from 200 to 300 degrees the signal voltage is from 21 to 36 mv. and with each 100 degree interval the slope is linear. At positions *a, b,* and *c* of switch 86 the range is illustratively 0–100 degrees; 100–200 degrees and 200–300 degrees. The meter at full scale illustratively has a reading of 100 degrees and requires 1 ma. therethrough to provide full scale indication. If the value of resistor 78 plus the meter resistance is 10,000 ohms, 10 volts is required across the meter to provide the required 1 ma. for full scale indication. With an input signal of 10 mv., the system must have a gain of 1,000.

With resistor 65 having a value of 1,000 ohms, then with a 10 mv. input signal, the current through resistor 65 is 10 microamperes. With the desired 10 volt output then resistor 83*a* must have a value of one megohm so that the current therethrough will also be 10 microamperes. Since the voltages providing the currents through resistors 65 and 83*a* are in opposition, the error voltage at junction Y will approach zero for equilibrium so that the output of the system will be retained at 10 volts with an input of 10 mv. This is the conventional operation of the feed back system which utilizes a high gain amplifier and the error signal must be very small.

As the output from the transducer from 100 to 200 degrees is from 10 to 21 mv., in order that the same meter be used, it is necessary that the signal, due to the first 100 degrees, i.e., 10 mv., be neutralized and also that the gain of the system be changed so that 11 mv. from 100 to 200 degrees will provide full range deflection on the meter, i.e., it is necessary that the voltage across the meter with a signal voltage of 11 mv. shall still be 10 volts.

To this end it is necessary that resistor 91*b* must cancel out 10 mv. of the input signal at range two and that the feed back network 83*a* to 83*h* also must reduce the gain of the system at range two to provide a 10 volt output with an 11 mv. input.

With an input of 21 mv. and a resistor 65 of 1,000 ohms, then 21 microamperes will flow through said resistor to junction Y. As it is desired that only 11 mv. of the input of 21 mv. be considered, if resistor 91*b* has a value of 30 megohms at −300 volts supplied, 10 microamperes will flow through said resistor and since the voltages causing the current flows through resistors 65 and 91*b* are in opposition, the effective voltage at junction Y, due to the input of 21 mv. will be 11 mv. It is desired that this voltage of 11 mv. cause a 10 volt output. If resistor 83*b* has a value of 909,090 ohms with a 10 volt output from the system, a current of 11 microamperes will flow through resistor 83*b* and since the voltage producing this current is in opposition to the voltage producing the current through resistor 65, and since both currents would flow to junction Y, the error signal at junction Y would approach zero so that the system would be in equilibrium, maintaining the output at 10 volts.

It is apparent therefore, that with an input voltage of 21 mv. the meter reading of 100 degrees when added to the value of 100 degrees indicated at range *b* of switch 86 will represent a temperature of 200 degrees.

Similarly, with the transducer output of 21 to 36 mv. over the range from 200 to 300 degrees, 21 mv. must be neutralized at range *c* and the gain of the system adjusted so that the remaining 15 mv. will still provide a 10 volt output to have full range indication on the meter 79.

With an input of 36 mv. then 36 microamperes will flow through resistor 65. If resistor 91*c* has a value of 14.286 megohms, then with an applied voltage of 300 volts, 21 microamperes will flow through resistor 91*c* and since the voltage producing this current is in opposition to the voltage producing the current through resistor 65, 21 mv. of the input signal of 36 mv. will be neutralized and an effective voltage of 15 mv. will be available.

If resistor 83*c* has a value of 666,700 ohms, with an output voltage of 10 volts, then 15 microamperes will flow through resistor 83*c* and since the voltage producing this current is in opposition to the voltage producing the current through resistor 65, the error signal at junction Y will approach zero, retaining the output at 10 volts as desired.

With the equipments above described, a high degree of resolution and accuracy is provided with a minimum effective meter error, even in readings of relatively small value and the single linearly calibrated dial may be used to provide accurate readings of even non-linear signal voltages.

As many changes could be made in the above equipments and many apparently widely different embodiments of this invention could be made without departing from the scope of the claim, it is intended that all matter contained in the above description or shown in the accompanying drawings shall be interpreted as illustrative and not in a limiting sense.

Having thus described my invention, what I claim as new and desire to secure by Letters Patent of the United States is:

A monitoring system to provide an output proportional to a direct current input signal, varying non-linearly over the total range of the condition to be monitored and varying substantially linearly with respect to given increments of such range, comprising means to amplify such direct current input signal, a meter having a full scale range with a given output signal thereacross, means to feed such amplified signal to said meter, means for each given increment of such total range to neutralize given increments of input signal equal to the increment related to the maximum value of the signal for the prior increment and to adjust the gain of the system for each increment so that for the maximum value of remaining signal for such increment, such given output signal will be provided to effect full scale indication on the meter, said means comprising a plurality of feed back networks corresponding to each given increment of such range, each network having an output resistance, means to connect any one of said networks into circuit to feed the output signal through said selected output resistance to develop an output voltage thereacross, a portion of said output resistance defining a feed back resistance, the ratio between the value of the output resistance and said portion of the output resistance determining the gain of the system, an additional resistance connected in series with said feed back resistance and a fixed source of potential, said amplifying means comprising a differential amplifier having two sections each having an input, means to connect the direct current input signal to one of said inputs and means to connect to the other of said inputs, the voltage developed across said feed back resistance due to the output signal thereacross and the voltage across said additional resistance caused by said fixed source of potential, thereby to oppose the input signal to effect such neutralization, whereby the signal to be amplified is the difference between the input signal and the feed back voltage.

References Cited in the file of this patent

UNITED STATES PATENTS 2,989,701    Gill _____ June 20, 1961

FOREIGN PATENTS 681,214    Great Britain _____ Oct. 22, 1952